Figure 1:
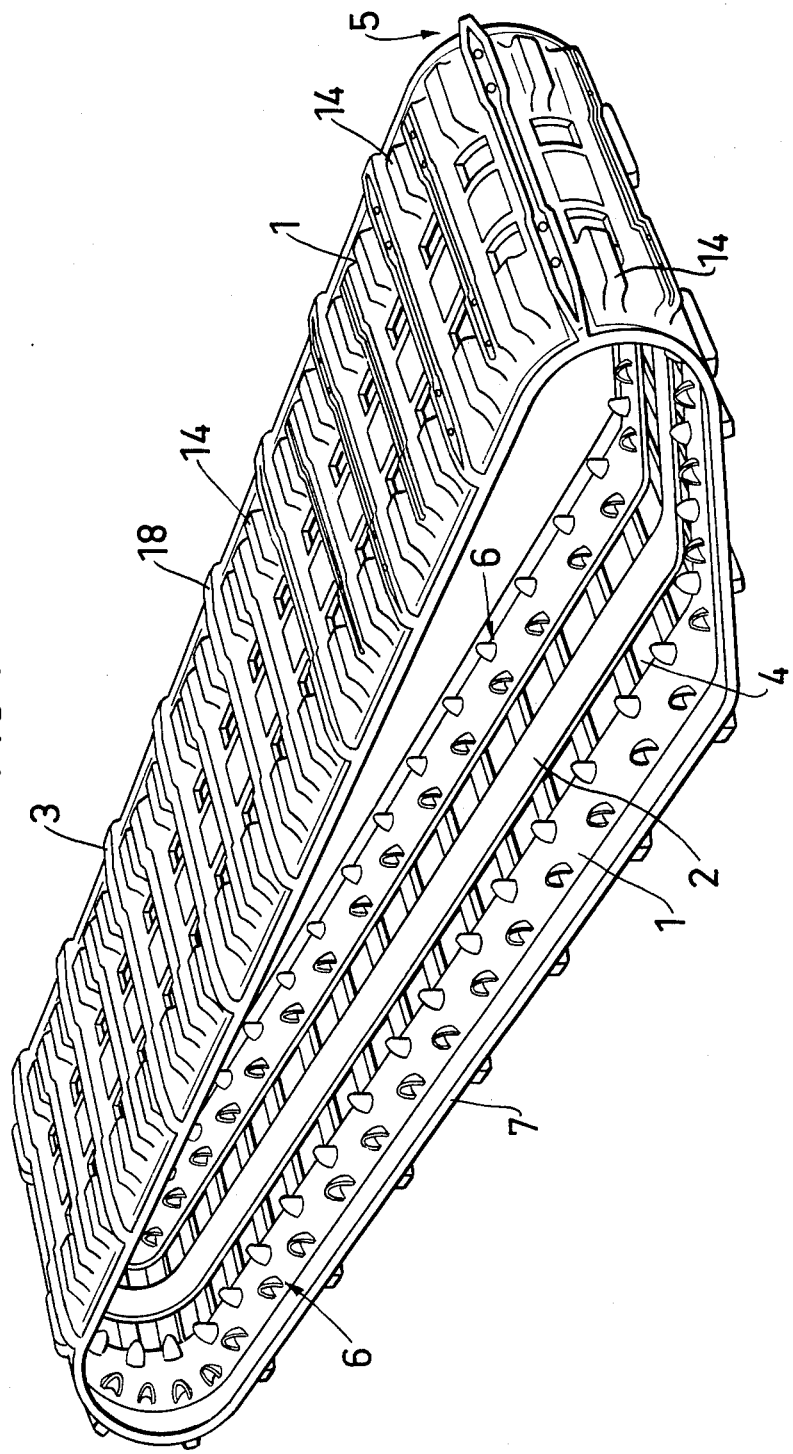

United States Patent [19]

Svensson et al.

[11] Patent Number: 4,714,302
[45] Date of Patent: Dec. 22, 1987

[54] VEHICLE TRACK

[75] Inventors: Assar Svensson, Ersmark; Dan Granlund, Skellefteå, both of Sweden

[73] Assignee: Skega Aktiebolag, Ersmark, Sweden

[21] Appl. No.: 291,967

[22] Filed: Aug. 11, 1981

Related U.S. Application Data

[63] Continuation of Ser. No. 000,446, Jan. 2, 1979, abandoned.

[30] Foreign Application Priority Data

Feb. 1, 1978 [SE] Sweden ............................... 7800024

[51] Int. Cl.$^4$ ............................................. B62D 55/24
[52] U.S. Cl. ................................ 305/35 EB; 305/38; 305/56
[58] Field of Search ...................... 180/9.62; 305/35 R, 305/35 EB, 38, 56, 57

[56] References Cited

U.S. PATENT DOCUMENTS

| | | | |
|---|---|---|---|
| 3,463,562 | 8/1969 | Svensson | 305/38 |
| 3,738,714 | 6/1973 | Ness | 305/35 EB |
| 3,747,995 | 7/1973 | Russ | 305/35 EB |

Primary Examiner—David A. Scherbel
Attorney, Agent, or Firm—Cushman, Darby & Cushman

[57] ABSTRACT

A vehicle track intended to be driven over spaced toothed drive wheels, preferably of rubber, and be supported on supporting wheels, comprising longitudinal inner and outer traction members formed of the same piece of an elastomer material and extending in parallel with each other, which traction members between themselves have tooth spaces for cooperation with the drive wheels, and transverse carrying members located on the outside of the track and connecting the longitudinal traction members, which longitudinal traction members and carrying members have cast-in reinforcements, and the reinforcement of each carrying member consists of a beam of metal cast-in in the carrying member and having substantially U-shaped cross-section, the legs of which face outward and have a shorter height than the carrying member, and guide tongues connected to the carrying members and located on the inside of the track are provided for cooperation with the supporting wheels of the vehicle, characterized in that the guide tongues are located on the outer traction members adjacent the tooth spaces, and that the portions of the carrying members which extend over the outer traction members have a greater height than in the area therebetween.

6 Claims, 5 Drawing Figures

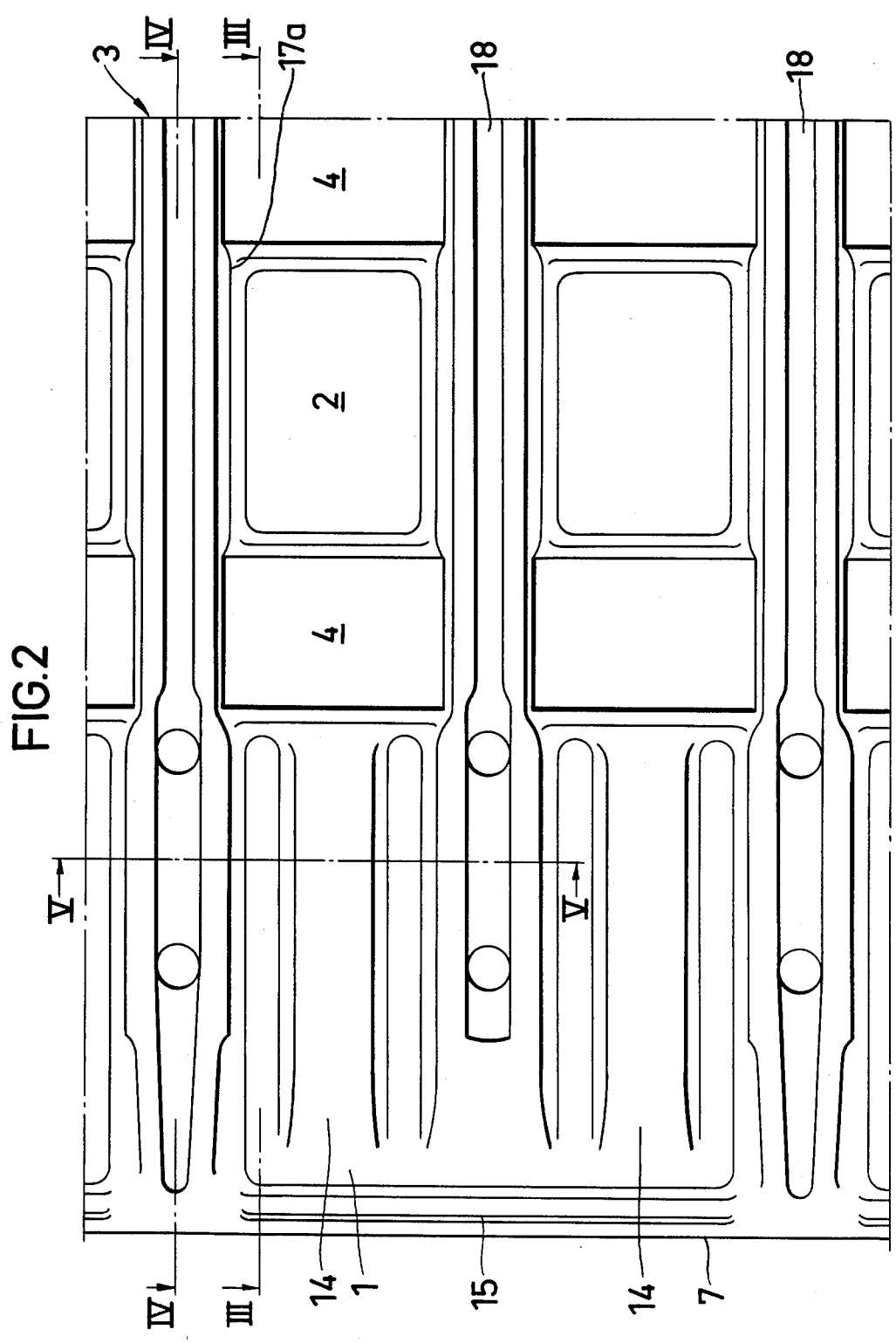

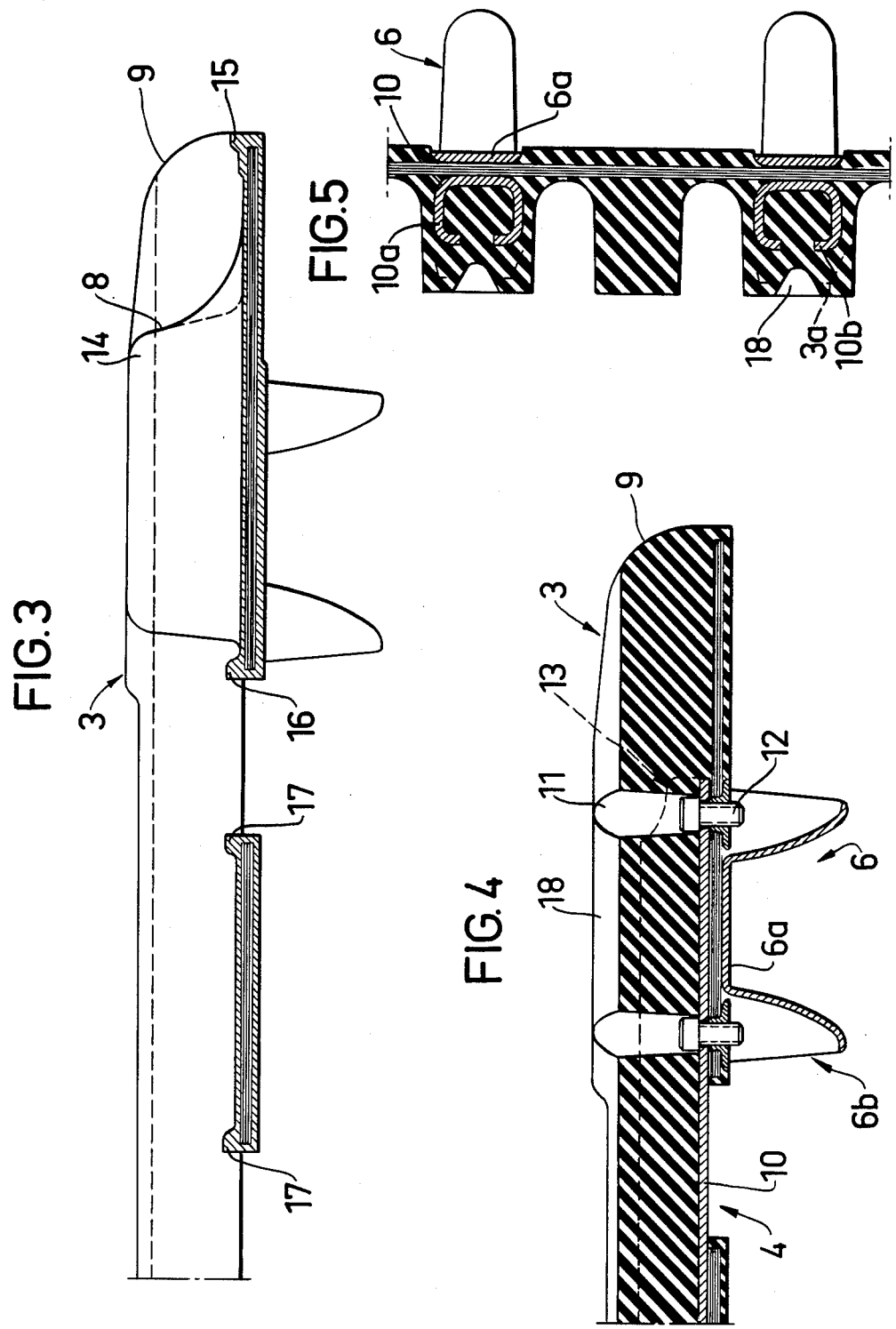

VEHICLE TRACK

This is a continuation of application Ser. No. 446 filed Jan. 2, 1979 and now abandoned.

This invention relates to a vehicle track, which is intended to be driven over toothed wheels and be supported on support wheels, and which comprises longitudinal traction members formed of the same piece of elastomer material and extending in spaced parallel relationship to each other, and transverse carrying members, which are located on the outside of the vehicle track and connect said longitudinal traction members, in such a manner, that both the longitudinal traction members and the carrying members include cast-in reinforcements, and the reinforcement of each carrying member consists of a metal beam of substantially U-shaped section, which is cast-in in the carrying member with its legs facing outward, and which has a height lower than the height of the carrying member.

Such vehicle tracks are previously known for vehicles comprising one drive wheel per track, which wheels engagingly co-operate with a central tooth space row formed in the track. In order to reduce the risk for the track of heeling-off at driving, and for obtaining a higher stability of the track and improving its steering, it has proved more advantageous in several respects to drive the track by two toothed drive wheels, which are arranged in spaced relationship on a common axle and engagingly co-operate each with a tooth spaced row in the track. For this purpose, two rows of tooth spaces instead of one have been formed in these known tracks. This arrangement, however, was found to give rise to unexplainable fatigue fractures in the transverse beams especially at driving on snowless ground. Such fractures, however, can be reduced substantially by increasing the beam dimension, but this solution involves other disadvantages as, for example, increased weight of the track and thereby higher ground pressure, resulting in detariorated advancing in snow. Furthermore, the division between the carrying members reinforced by metal beams can be reduced, but this step implies greater rolling resistance and bending stress and also smaller tooth spaces, so that the drive wheels are to be made of steel in order to resist arising stresses. The use of steel wheels, however, instead of rubber wheels has the disadvantage of unfavourably increasing the noise level.

The present invention, therefore, has the object to solve the aforesaid problems and to produce a vehicle track of the kind described above in the introductory portion and intended to be driven by two drive wheels, which track does not show the aforesaid disadvantages, but has at least the advantages of the known vehicle track with one tooth space row with respect to strength and capacity of advancing both on snowless ground and in deep snow, and in which track the reinforcing beams cast-in in the transverse members have the smallest possible dimension. For imparting these properties to the vehicle track and thus to bring about an improvement over known track types of the kind here concerned, the vehicle track according to the present invention has been given the characterizing features defined in the claims.

The invention is described in greater detail in the following, with reference to the accompanyng drawings, in which FIG. 1 is a perspective view of an embodiment of the vehicle track according to the invention in about the form, in which the track has been applied on a vehicle, for which the track is intended to be used, FIG. 2 is a horizontal view on an enlarged scale of a portion of the track surface facing upward in FIG. 1, FIG. 3 is a section along the line III—III in FIG. 2, FIG. 4 is a section along the line IV—IV in FIG. 2, and FIG. 5 is a section along the line V—V in FIG. 2.

The vehicle track according to the invention comprises longitudinal traction members 1, 2 in the form of tracks of elastomer material, for example rubber, which are arranged to the side of each other with a gap therebetween. The two outer ones 1 of said traction members have the same shape, and transverse carrying members 3 connecting the traction members 1,2 are made of the same elastomer material as the traction members 1,2. Said transverse carrying members 3 have a substantially extension in the vertical direction in order to engage with the ground support and are arranged in a predetermined spaced relationship to each other so as to form between themselves tooth spaces 4, which are arranged in two longitudinal rows on both sides of the traction members 2 located centrally in the track. Said tooth spaces 4 are capable for the purpose of driving to engagingly co-operate with the toothed drive wheels of the vehicle which abut the inside of the carrying members. Said drive wheels are not shown in the drawings, but shall be located in the area designated by 5 in FIG. 1. With the division between the carrying members 3 as shown at the embodiment, the drive wheels can consist of rubber, which is advantageous from a noise point of view, because the noise is held on a low level, which is substantially lower than the level obtained when wheels of steels are to be used, and such steel wheels must be used when, for example, the division between the carrying members 3 shown in the drawings is halved, as otherwise the wheels would not be capable to resist the arising stresses. The track, furthermore, is supported on support wheels at the vehicle which are not shown, either, in the drawings, but for which the track is provided on its inside with guide tongues 6 arranged in two rows and attached to the two outer traction members 1 directly in front of the carrying members 3.

At the embodiment shown in the drawings every second carrying member 3 extends all the way out to the outer edges 7 of the track, while every second member terminates between the centre of the respective traction member and the outer edges 7, and preferably closer to the centre than to the outer edges 7. The ends of the shorter carrying members 3 have concave shape 8, and the ends of the longer carrying members 3 have convex rounded shape 9. At the embodiment shown every second carrying member is long and every second one is shorter, but it is also possible within the scope of the invention to arrange between two long carrying members 3 two or three shorter carrying members 3, if the track length allows for it. This arrangement of some carrying members being shorter than other members is applied in order to impart to the outer portions of the track a suitable flexibility and thereby a good adaptiveness to the ground support, so that the track has a better bearing capacity especially at driving in snow. Within every carrying member 3 a reinforcing beam 10 of metal, for example steel, is cast-in, the length of which is the same for all carrying members 3. Said metal beam 10, however, is somewhat shorter than the shortest carrying members, but has such a length that it extends inward over the outer traction members in any case such a distance, that it constitutes a support for the corresponding pair of guide tongues 6 located on the inside of the two outer traction members 1. Each guide tongue is formed with two lateral supports 6b for the support wheels of the vehicle, which lateral supports are connected by a bottom plate 6a. Thus, the load from the vehicle is transferred via said wheels to the track, more precisely to the two outer traction members 1 thereof located outside the tooth space rows 4. Each guide tongue 6 is attached exchangeably to a beam 10 by at least two screws 12, which can be inserted through holes 11 in the associated carrying member 3, as shown a.o. in FIG. 4. Every reinforcing beam 10 has U-shaped cross-sectional configuration, of which the legs 10a extend outward and have end portions 10b bent in the direction toward each other. The reinforcing beams 10 have equal height along their entire length, possibly with the exception of a short piece 13 at both ends as indicated by dashed lines in FIG. 4, and at the embodiment shown are uncovered from rubber on their inside in the area of the tooth spaces 4 whereby the driving engagement with rubber against metal takes place.

The carrying members 3, distinguished from the reinforcing beams 10, do not show equal height and cross-sectional shape along their entire length, but have a greater height along those portions, which extend over the outer traction members 1, and especially those portions, which are located directly in front of the guide tongues 6, i.e. in the area where the load is transferred and the ground pressure is at greatest, than between the two outer traction members 1 where the tops or outer portions of the carrying members have slightly outward tapering shape, as indicated by the dashed lines 3a in FIG. 5. The carrying members 3, as shown in the drawings, may also have a height slightly decreasing toward their ends 9. This, of course, applies only to the longer carrying members. By this configuration of the carrying members 3 the stresses on the reinforcing beams 10 are substantially reduced, so that beams of much smaller dimension can be used than otherwise would have been possible. Thus, the track is relatively light without disregarding its strength.

Between the carrying members 3 on the two outer traction members 1 supporting cushions 14 are located, which are of the same elastomer material as the track in general or of a somewhat softer rubber material. The said supporting cushions 14 extend from the inner edge of the respective traction member to its outer edge 7 and terminate at about the same distance therefrom as the shorter carrying members 3 and may also have the same end section as said latter members. The supporting cushions 14 have no reinforcing beam and may have the same or a slightly greater height than the greatest height of the carrying members in order not to be compressed to a greater extent than the carrying members when they are exposed to the pressure caused by the support wheels 8. Owing to said cushions, the track is prevented from being bent down between the carrying members 3. As a result thereof, not only a lower rolling resistance is obtained, but also a more noiseless operation and at the same time a more favourable load on the reinforcing beams 10.

On the surface of the two outer traction members which faces toward the ground, longitudinal ribs 15 extending between the longer carrying members, and longitudinal ribs 16 extending between two carrying members are provided to bring about lateral stabilization at driving on a soft support as, for example, snow. Similar longitudinal ribs 17 are also provided on the central traction member 2 at its edges extending between the transverse members 3. Said member 2 may also have transverse reinforcing ridges 17a at its edges facing toward the carrying members 3. The traction member 2 in general shall have a smooth surface so as at driving in snow or the like to form entirely coherent or unbroken carrying cushions of snow between the carrying members 3, which is of great importance for obtaining the necessary bearing capacity and thereby the capacity of advancing in snow. For obtaining optimum grip, furthermore, every carrying member 3 preferably is provided with a groove 18 as shown in the drawings. By such grooves also the amount of material in the carrying members 3 is reduced, whereby the track is given a lighter weight, and the grooves also contribute at the embodiment shown to obtaining the same degree of compression for both the carrying members and the supporting cushions 14.

The present invention is not restricted to what is described above and shown in the drawings, but can be altered, modified and completed in many different ways within the scope of the invention idea set forth in the attached claims. In the traction member 1, for example, two reinforcing wires of steel wire and/or reinforcing cord can be cast-in.

What we claim is:

1. A vehicle track intended to be driven over spaced toothed drive wheels, preferably of rubber, and be supported on supporting wheels, comprising longitudinal inner and outer traction members formed of the same piece of an elastomer material and extending in parallel with each other, which traction members between themselves have tooth spaces for cooperation with the drive wheels, and transverse carrying members located on the outside of the track and connecting said longitudinal traction members, which longitudinal traction members and carrying members have cast-in reinforcements, and the reinforcement of each carrying member includes a beam of metal cast in the carrying member and having substantially U-shaped cross-section, the legs of which face outward and have a shorter height than the carrying member, and guide tongues located on the inside of the track are provided for cooperation with the supporting wheels of the vehicle, characterized in that the guide tongues are located on the outer traction members adjacent the tooth spaces and are connected directly to the beams, and that the portions of the carrying members which extend over the outer traction members have a greater height than in the whole of the area between the outer traction members.

2. A vehicle track according to claim 1, characterized in that between the transverse carrying members supporting cushions of an elastomer material are arranged on the outer traction members and have at least the same height as the greatest height of the carrying members.

3. A vehicle track according to claim 1 or 2, characterized in that it comprises three traction members, the tooth spaces being located on both sides of the central traction member, which between the carrying members shows a smooth surface.

4. A vehicle track according to claim 2, characterized in that the supporting cushions extend from the inner edge of the respective outer traction member in the direction to the outer edge thereof and terminate at a distance therefrom.

5. A vehicle track according to claim 4, characterized in that the supporting cushions have at least the same extension in the transverse direction of the track as the guide tongues, which are formed each with two lateral supports and a portion connecting said lateral supports and abutting the track.

6. An endless flexible vehicle track formed of elastomer material for use with spaced toothed wheels comprising: an inner endless traction member and two parallel outer endless traction members laterally spaced from the inner traction member on opposite sides thereof; a plurality of spaced-apart parallel transverse carrying members located on the outside of the track and projecting along the whole of their length from the track at the locations of the traction members and at the locations of the spaces between the traction members, each carrying member connecting the inner and outer traction members, the portions of each carrying member overlying the two outer traction members having a greater height than the portion overlying the inner traction member, a metal reinforcing beam cast within each carrying member extending transversely of the traction members and overlying at least a portion of each outer traction member, the arrangement of traction members and carrying members forming two rows of tooth spaces for cooperation with two toothed wheels; and guide tongues connected directly to the beams at locations adjacent the tooth spaces for cooperating with a wheel.

* * * * *